US010924362B2

(12) United States Patent
Mallah et al.

(10) Patent No.: US 10,924,362 B2
(45) Date of Patent: Feb. 16, 2021

(54) MANAGEMENT OF SOFTWARE BUGS IN A DATA PROCESSING SYSTEM

(71) Applicant: Palantir Technologies Inc., Palo Alto, CA (US)

(72) Inventors: Amr Al Mallah, New York, NY (US); Mahmoud Abdelsalam, Kirkland, WA (US); Michael Nazario, New York, NY (US); Peter Wang, Seattle, WA (US); Vivek Lakshmanan, Seattle, WA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/940,740

(22) Filed: Mar. 29, 2018

(65) Prior Publication Data

US 2019/0222490 A1    Jul. 18, 2019

(51) Int. Cl.
*G06F 9/44* (2018.01)
*G06F 9/445* (2018.01)
(Continued)

(52) U.S. Cl.
CPC ............ *H04L 41/5054* (2013.01); *G06F 8/73* (2013.01); *G06F 9/451* (2018.02); *G06F 11/362* (2013.01);
(Continued)

(58) Field of Classification Search
CPC ....... H04L 41/5054; G06F 9/451; G06F 8/73; G06F 11/362; G06F 11/366; G06F 11/3664
(Continued)

(56) References Cited

U.S. PATENT DOCUMENTS

| 4,881,179 A | 11/1989 | Vincent |
| 5,241,625 A | 8/1993 | Epard et al. |

(Continued)

FOREIGN PATENT DOCUMENTS

| AU | 2013251186 | 11/2015 |
| CN | 102054015 | 5/2014 |

(Continued)

OTHER PUBLICATIONS

"A Quick Guide to UniProtKB Swiss-Prot & TrEMBL," Sep. 2011, pp. 2.

(Continued)

*Primary Examiner* — Chuck O Kendall
(74) *Attorney, Agent, or Firm* — Sheppard Mullin Richter & Hampton LLP

(57) ABSTRACT

Methods, systems and computer programs are disclosed for managing data bugs in a data processing system comprising one or more data resources. The method may comprise receiving an indication of one or more bugs relating to one or more data resources, and contextual information for the one or more bugs and determining, from the received indication, one or more bug types and grouping the bugs by bug type for the same data resource to produce a aggregated list of open issues requiring fixing. Further operations may comprise presenting the aggregated list of one or more open issues on a user interface for selection, the one or more open issues being selectable, and, responsive to receiving selection of a particular open issue, presenting contextual information for the one or more bugs within the group on the user interface.

20 Claims, 7 Drawing Sheets

(51) Int. Cl.
*H04L 12/24* (2006.01)
*G06F 11/36* (2006.01)
*G06F 9/451* (2018.01)
*G06F 8/73* (2018.01)

(52) U.S. Cl.
CPC ........ *G06F 11/366* (2013.01); *G06F 11/3664* (2013.01)

(58) Field of Classification Search
USPC .................................. 717/124–130, 168–178
See application file for complete search history.

(56) References Cited

U.S. PATENT DOCUMENTS

| | | | |
|---|---|---|---|
| 5,418,950 A | 5/1995 | Li et al. | |
| 5,428,737 A | 6/1995 | Li et al. | |
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,845,300 A | 12/1998 | Comer | |
| 5,857,329 A | 1/1999 | Bingham | |
| 5,911,138 A | 6/1999 | Li et al. | |
| 5,918,225 A | 6/1999 | White et al. | |
| 5,999,911 A | 12/1999 | Berg et al. | |
| 6,065,026 A | 5/2000 | Cornelia et al. | |
| 6,101,479 A | 8/2000 | Shaw | |
| 6,208,985 B1 | 3/2001 | Krehel | |
| 6,232,971 B1 | 5/2001 | Haynes | |
| 6,236,994 B1 | 5/2001 | Swartz et al. | |
| 6,237,138 B1 | 5/2001 | Hameluck et al. | |
| 6,243,706 B1 | 6/2001 | Moreau et al. | |
| 6,279,018 B1 | 8/2001 | Kudrolli et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,370,538 B1 | 4/2002 | Lamping et al. | |
| 6,430,305 B1 | 8/2002 | Decker | |
| 6,513,155 B1 * | 1/2003 | Alexander, III | G06F 11/3409 717/124 |
| 6,523,019 B1 | 2/2003 | Borthwick | |
| 6,642,945 B1 | 11/2003 | Sharpe | |
| 6,643,613 B2 | 11/2003 | McGee et al. | |
| 6,665,683 B1 | 12/2003 | Meltzer | |
| 6,745,382 B1 | 6/2004 | Zothner | |
| 6,850,317 B2 | 2/2005 | Mullins et al. | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,944,777 B1 | 9/2005 | Belani et al. | |
| 6,944,821 B1 | 9/2005 | Bates et al. | |
| 6,967,589 B1 | 11/2005 | Peters | |
| 6,976,024 B1 | 12/2005 | Chavez et al. | |
| 6,978,419 B1 | 12/2005 | Kantrowitz | |
| 7,028,223 B1 | 4/2006 | Kolawa et al. | |
| 7,085,890 B2 | 8/2006 | Kashyap | |
| 7,086,028 B1 | 8/2006 | Davis et al. | |
| 7,155,728 B1 | 12/2006 | Prabhu et al. | |
| 7,174,377 B2 | 2/2007 | Bernard et al. | |
| 7,194,680 B1 | 3/2007 | Roy et al. | |
| 7,213,030 B1 | 5/2007 | Jenkins | |
| 7,216,133 B2 | 5/2007 | Wu et al. | |
| 7,392,254 B1 | 6/2008 | Jenkins | |
| 7,406,592 B1 | 7/2008 | Polyudov | |
| 7,441,182 B2 | 10/2008 | Beilinson et al. | |
| 7,441,219 B2 | 10/2008 | Perry et al. | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,627,812 B2 | 12/2009 | Chamberlain et al. | |
| 7,634,717 B2 | 12/2009 | Chamberlain et al. | |
| 7,716,140 B1 | 5/2010 | Nielsen et al. | |
| 7,765,489 B1 | 7/2010 | Shah | |
| 7,770,100 B2 | 8/2010 | Chamberlain et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,880,921 B2 | 2/2011 | Dattilo et al. | |
| 7,908,521 B2 | 3/2011 | Sridharan et al. | |
| 7,941,336 B1 | 5/2011 | Robin-Jan | |
| 7,958,147 B1 | 6/2011 | Turner et al. | |
| 7,962,848 B2 | 6/2011 | Bertram | |
| 7,966,199 B1 | 6/2011 | Frasher | |
| 7,979,424 B2 | 7/2011 | Dettinger et al. | |
| 8,001,465 B2 | 8/2011 | Kudrolli et al. | |
| 8,001,482 B2 | 8/2011 | Bhattiprolu et al. | |
| 8,010,507 B2 | 8/2011 | Poston et al. | |
| 8,073,857 B2 | 12/2011 | Sreekanth | |
| 8,103,962 B2 | 1/2012 | Embley et al. | |
| 8,191,005 B2 | 5/2012 | Baier et al. | |
| 8,225,201 B2 | 7/2012 | Michael | |
| 8,290,838 B1 | 10/2012 | Thakur et al. | |
| 8,302,855 B2 | 11/2012 | Ma et al. | |
| 8,312,367 B2 | 11/2012 | Foster | |
| 8,392,556 B2 | 3/2013 | Goulet et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,527,949 B1 | 9/2013 | Pleis et al. | |
| 8,560,494 B1 | 10/2013 | Downing | |
| 8,620,641 B2 | 12/2013 | Farnsworth et al. | |
| 8,639,552 B1 | 1/2014 | Chen et al. | |
| 8,682,696 B1 | 3/2014 | Shanmugam | |
| 8,688,573 B1 | 4/2014 | Ruknoic et al. | |
| 8,732,574 B2 | 5/2014 | Burr et al. | |
| 8,799,313 B2 | 8/2014 | Satlow | |
| 8,799,867 B1 | 8/2014 | Peri-Glass et al. | |
| 8,807,948 B2 | 8/2014 | Luo et al. | |
| 8,909,597 B2 | 12/2014 | Aymeloglu et al. | |
| 8,924,429 B1 | 12/2014 | Fisher et al. | |
| 8,930,874 B2 | 1/2015 | Duff et al. | |
| 8,935,201 B1 | 1/2015 | Fisher et al. | |
| 8,938,686 B1 | 1/2015 | Erenrich et al. | |
| 8,984,390 B2 | 3/2015 | Aymeloglu et al. | |
| 9,031,981 B1 | 5/2015 | Potter et al. | |
| 9,058,315 B2 | 6/2015 | Burr et al. | |
| 9,105,000 B1 | 8/2015 | White et al. | |
| 9,165,100 B2 | 10/2015 | Begur et al. | |
| 9,286,373 B2 | 3/2016 | Elliot et al. | |
| 9,292,388 B2 | 3/2016 | Fisher et al. | |
| 9,330,120 B2 | 5/2016 | Colgrove et al. | |
| 9,348,677 B2 | 5/2016 | Marinelli, III et al. | |
| 9,348,880 B1 | 5/2016 | Kramer et al. | |
| 9,378,526 B2 | 6/2016 | Sampson | |
| 2001/0021936 A1 | 9/2001 | Bertram | |
| 2002/0032677 A1 | 3/2002 | Morgenthaler et al. | |
| 2002/0095360 A1 | 7/2002 | Joao | |
| 2002/0103705 A1 | 8/2002 | Brady | |
| 2002/0184111 A1 | 12/2002 | Swanson | |
| 2002/0196229 A1 | 12/2002 | Chen et al. | |
| 2003/0004770 A1 | 1/2003 | Miller et al. | |
| 2003/0023620 A1 | 1/2003 | Trotta | |
| 2003/0028560 A1 | 2/2003 | Kudrolli et al. | |
| 2003/0036927 A1 | 2/2003 | Bowen | |
| 2003/0061132 A1 | 3/2003 | Mason et al. | |
| 2003/0093755 A1 | 5/2003 | O'Carroll | |
| 2003/0105833 A1 | 6/2003 | Daniels | |
| 2003/0126102 A1 | 7/2003 | Borthwick | |
| 2003/0212670 A1 | 11/2003 | Yalamanchi et al. | |
| 2004/0034570 A1 | 2/2004 | Davis | |
| 2004/0044648 A1 | 3/2004 | Anfindsen et al. | |
| 2004/0078451 A1 | 4/2004 | Dietz et al. | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |

(56) References Cited

U.S. PATENT DOCUMENTS

| | | |
|---|---|---|
| 2004/0153837 A1 | 8/2004 | Preston et al. |
| 2004/0193608 A1 | 9/2004 | Gollapudi et al. |
| 2004/0205492 A1 | 10/2004 | Newsome |
| 2004/0236688 A1 | 11/2004 | Bozeman |
| 2004/0236711 A1 | 11/2004 | Nixon et al. |
| 2004/0254658 A1 | 12/2004 | Sherriff et al. |
| 2004/0260702 A1 | 12/2004 | Cragun et al. |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0120080 A1 | 6/2005 | Weinreb et al. |
| 2005/0125715 A1 | 6/2005 | Di Franco et al. |
| 2005/0183005 A1 | 8/2005 | Denoue et al. |
| 2005/0226473 A1 | 10/2005 | Ramesh |
| 2005/0278286 A1 | 12/2005 | Djugash et al. |
| 2006/0004740 A1 | 1/2006 | Dettinger et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0070046 A1 | 3/2006 | Balakrishnan et al. |
| 2006/0074866 A1 | 4/2006 | Chamberlain et al. |
| 2006/0074967 A1 | 4/2006 | Shaburov |
| 2006/0080139 A1 | 4/2006 | Mainzer |
| 2006/0080616 A1 | 4/2006 | Vogel et al. |
| 2006/0116991 A1 | 6/2006 | Calderwood |
| 2006/0129746 A1 | 6/2006 | Porter |
| 2006/0129992 A1 | 6/2006 | Oberholtzer et al. |
| 2006/0136513 A1 | 6/2006 | Ngo et al. |
| 2006/0142949 A1 | 6/2006 | Helt |
| 2006/0143075 A1 | 6/2006 | Carr et al. |
| 2006/0155654 A1 | 7/2006 | Plessis et al. |
| 2006/0178915 A1 | 8/2006 | Chao |
| 2006/0209085 A1 | 9/2006 | Wong et al. |
| 2006/0265417 A1 | 11/2006 | Amato et al. |
| 2006/0271838 A1 | 11/2006 | Carro |
| 2006/0271884 A1 | 11/2006 | Hurst |
| 2006/0277460 A1 | 12/2006 | Forstall et al. |
| 2006/0288046 A1 | 12/2006 | Gupta et al. |
| 2007/0000999 A1 | 1/2007 | Kubo et al. |
| 2007/0005582 A1 | 1/2007 | Navratil et al. |
| 2007/0018986 A1 | 1/2007 | Hauser |
| 2007/0027851 A1 | 2/2007 | Kruy et al. |
| 2007/0043686 A1 | 2/2007 | Teng et al. |
| 2007/0061752 A1 | 3/2007 | Cory |
| 2007/0094248 A1 | 4/2007 | McVeigh et al. |
| 2007/0113164 A1 | 5/2007 | Hansen et al. |
| 2007/0136095 A1 | 6/2007 | Weinstein |
| 2007/0150805 A1 | 6/2007 | Misovski |
| 2007/0168336 A1 | 7/2007 | Ransil et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185850 A1 | 8/2007 | Walters et al. |
| 2007/0192281 A1 | 8/2007 | Cradick et al. |
| 2007/0245339 A1 | 10/2007 | Bauman et al. |
| 2007/0260582 A1 | 11/2007 | Liang |
| 2007/0284433 A1 | 12/2007 | Domenica et al. |
| 2007/0299697 A1 | 12/2007 | Friedlander et al. |
| 2008/0016155 A1 | 1/2008 | Khalatian |
| 2008/0091693 A1 | 4/2008 | Murthy |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0155440 A1 | 6/2008 | Trevor et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0196016 A1 | 8/2008 | Todd |
| 2008/0201313 A1 | 8/2008 | Dettinger et al. |
| 2008/0215543 A1 | 9/2008 | Huang et al. |
| 2008/0249820 A1 | 10/2008 | Pathria |
| 2008/0267386 A1 | 10/2008 | Cooper |
| 2008/0276167 A1 | 11/2008 | Michael |
| 2008/0288475 A1 | 11/2008 | Kim et al. |
| 2008/0313132 A1 | 12/2008 | Hao et al. |
| 2008/0313243 A1 | 12/2008 | Poston et al. |
| 2009/0006150 A1 | 1/2009 | Prigge et al. |
| 2009/0007056 A1 | 1/2009 | Prigge et al. |
| 2009/0024962 A1 | 1/2009 | Gotz |
| 2009/0031401 A1 | 1/2009 | Cudich et al. |
| 2009/0043762 A1 | 2/2009 | Shiverick et al. |
| 2009/0043801 A1 | 2/2009 | LeClair |
| 2009/0055487 A1 | 2/2009 | Moraes et al. |
| 2009/0083275 A1 | 3/2009 | Jacob et al. |
| 2009/0089651 A1 | 4/2009 | Herberger et al. |
| 2009/0094217 A1 | 4/2009 | Dettinger et al. |
| 2009/0106178 A1 | 4/2009 | Chu |
| 2009/0112678 A1 | 4/2009 | Luzardo |
| 2009/0112745 A1 | 4/2009 | Stefanescu |
| 2009/0144747 A1 | 6/2009 | Baker |
| 2009/0150868 A1 | 6/2009 | Chakra et al. |
| 2009/0161147 A1 | 6/2009 | Klave |
| 2009/0164934 A1 | 6/2009 | Bhattiprolu et al. |
| 2009/0172674 A1 | 7/2009 | Bobak et al. |
| 2009/0177962 A1 | 7/2009 | Gusmorino et al. |
| 2009/0187546 A1 | 7/2009 | Whyte et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0199106 A1 | 8/2009 | Jonsson et al. |
| 2009/0216562 A1 | 8/2009 | Faulkner et al. |
| 2009/0248721 A1 | 10/2009 | Burton et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0299830 A1 | 12/2009 | West et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2010/0004857 A1 | 1/2010 | Pereira et al. |
| 2010/0011282 A1 | 1/2010 | Dollard et al. |
| 2010/0057622 A1 | 3/2010 | Faith et al. |
| 2010/0070464 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0073315 A1 | 3/2010 | Lee et al. |
| 2010/0076813 A1 | 3/2010 | Ghosh et al. |
| 2010/0082671 A1 | 4/2010 | Li et al. |
| 2010/0098318 A1 | 4/2010 | Anderson |
| 2010/0122152 A1 | 5/2010 | Chamberlain et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0223260 A1 | 9/2010 | Wu |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2011/0035396 A1 | 2/2011 | Merz et al. |
| 2011/0041084 A1 | 2/2011 | Karam |
| 2011/0047540 A1 | 2/2011 | Williams et al. |
| 2011/0066497 A1 | 3/2011 | Gopinath et al. |
| 2011/0074788 A1 | 3/2011 | Regan et al. |
| 2011/0074811 A1 | 3/2011 | Hanson et al. |
| 2011/0093327 A1 | 4/2011 | Fordyce, III et al. |
| 2011/0093490 A1 | 4/2011 | Schindlauer et al. |
| 2011/0099133 A1 | 4/2011 | Chang et al. |
| 2011/0107196 A1 | 5/2011 | Foster |
| 2011/0131547 A1 | 6/2011 | Elaasar |
| 2011/0145401 A1 | 6/2011 | Westlake |

(56) References Cited

U.S. PATENT DOCUMENTS

| | | |
|---|---|---|
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0208822 A1 | 8/2011 | Rathod |
| 2011/0219360 A1* | 9/2011 | Srinivasa ............... G06F 16/00 717/124 |
| 2011/0225482 A1 | 9/2011 | Chan et al. |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0321008 A1 | 12/2011 | Jhoney et al. |
| 2012/0004894 A1 | 1/2012 | Butler |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0078595 A1 | 3/2012 | Balandin et al. |
| 2012/0084117 A1 | 4/2012 | Tavares et al. |
| 2012/0084184 A1 | 4/2012 | Raleigh |
| 2012/0102022 A1 | 4/2012 | Miranker et al. |
| 2012/0123989 A1 | 5/2012 | Yu et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0197657 A1 | 8/2012 | Prodanovic |
| 2012/0197660 A1 | 8/2012 | Prodanovic |
| 2012/0215784 A1 | 8/2012 | King et al. |
| 2012/0226590 A1 | 9/2012 | Love et al. |
| 2012/0266245 A1 | 10/2012 | McDougal et al. |
| 2012/0284670 A1 | 11/2012 | Kashik et al. |
| 2012/0284719 A1 | 11/2012 | Phan et al. |
| 2012/0304244 A1 | 11/2012 | Xie et al. |
| 2012/0323829 A1 | 12/2012 | Stokes et al. |
| 2013/0016106 A1 | 1/2013 | Yip et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0055264 A1 | 2/2013 | Burr et al. |
| 2013/0086482 A1 | 4/2013 | Parsons |
| 2013/0096968 A1 | 4/2013 | Van Pelt et al. |
| 2013/0097482 A1 | 4/2013 | Marantz et al. |
| 2013/0124567 A1 | 5/2013 | Balinsky et al. |
| 2013/0151305 A1 | 6/2013 | Akinola et al. |
| 2013/0151453 A1 | 6/2013 | Bhanot et al. |
| 2013/0152047 A1* | 6/2013 | Moorthi ............... G06F 11/368 717/124 |
| 2013/0166480 A1 | 6/2013 | Popescu et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0262527 A1 | 10/2013 | Hunter et al. |
| 2013/0262528 A1 | 10/2013 | Foit |
| 2013/0263679 A1 | 10/2013 | Castellanos et al. |
| 2013/0288719 A1 | 10/2013 | Alonzo |
| 2014/0012886 A1 | 1/2014 | Downing et al. |
| 2014/0074888 A1 | 3/2014 | Potter et al. |
| 2014/0089339 A1 | 3/2014 | Siddiqui et al. |
| 2014/0108074 A1 | 4/2014 | Miller et al. |
| 2014/0115589 A1 | 4/2014 | Marinelli, III et al. |
| 2014/0115610 A1 | 4/2014 | Marinelli, III et al. |
| 2014/0129936 A1 | 5/2014 | Richards et al. |
| 2014/0208281 A1 | 7/2014 | Ming |
| 2014/0214579 A1 | 7/2014 | Shen et al. |
| 2014/0222793 A1 | 8/2014 | Sadkin et al. |
| 2014/0244284 A1 | 8/2014 | Smith |
| 2014/0244388 A1 | 8/2014 | Manouchehri et al. |
| 2014/0358829 A1 | 12/2014 | Hurwitz |
| 2015/0026622 A1 | 1/2015 | Roaldson et al. |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106379 A1 | 4/2015 | Elliot et al. |
| 2015/0112641 A1 | 4/2015 | Faraj |
| 2015/0186483 A1 | 7/2015 | Tappan et al. |
| 2015/0212663 A1 | 7/2015 | Papale et al. |
| 2015/0254220 A1 | 9/2015 | Burr et al. |
| 2015/0269030 A1 | 9/2015 | Fisher et al. |
| 2016/0026923 A1 | 1/2016 | Erenrich et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| DE | 102014103482 | 9/2014 |
| EP | 1647908 | 4/2006 |
| EP | 1672527 | 6/2006 |
| EP | 2 634 745 | 9/2013 |
| EP | 2743839 | 6/2014 |
| EP | 2778986 | 9/2014 |
| EP | 2921975 | 9/2015 |
| EP | 2993595 | 3/2016 |
| EP | 3002691 | 4/2016 |
| EP | 3009943 | 4/2016 |
| EP | 3032441 | 6/2016 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 01/025906 | 4/2001 |
| WO | WO 2001/088750 | 11/2001 |
| WO | WO 2007/133206 | 11/2007 |
| WO | WO 2010/030913 | 3/2010 |
| WO | WO 2010/030914 | 3/2010 |
| WO | WO 2010/030917 | 3/2010 |
| WO | WO 2012/119008 | 9/2012 |
| WO | WO 2013/030595 | 3/2013 |

OTHER PUBLICATIONS

"A Tour of Pinboard," <http://pinboard.in/tour> as printed May 15, 2014 in 6 pages.

"GrabUp—What a Timesaver!" <http://atlchris.com/191/grabup/>, Aug. 11, 2008, pp. 3.

"Remove a Published Document or Blog Post," Sharing and Collaborating on Blog Post.

"The FASTA Program Package," fasta-36.3.4, Mar. 25, 2011, pp. 29.

"Java Remote Method Invocation: 7—Remote Object Activation," Dec. 31, 2010, retrieved from the internet Mar. 15, 2016 https://docs.oracle.com/javase/7/docs/platform/rmi/spec/rmi-activation2.html.

Abbey, Kristen, "Review of Google Docs," May 1, 2007, pp. 2.

Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWaK 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bluttman et al., "Excel Formulas and Functions for Dummies," 2005, Wiley Publishing, Inc., pp. 280, 284-286.

Bogle et al., "Reducing Cross-Domain Call Overhead Using Batched Futures," SIGPLAN No. 29, 10 (Oct. 1994) pp. 341-354.

(56) References Cited

OTHER PUBLICATIONS

Bogle, Phillip Lee, "Reducing Cross-Domain Call Overhead Using Batched Futures," May 1994, Massachusetts Institute of Technology, pp. 96.
Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.
Canese et al., "Chapter 2: PubMed: The Bibliographic Database," The NCBI Handbook, Oct. 2002, pp. 1-10.
Chaudhuri et al., "An Overview of Business Intelligence Technology," Communications of the ACM, Aug. 2011, vol. 54, No. 8.
Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.
Conner, Nancy, "Google Apps: The Missing Manual," May 1, 2008, pp. 15.
Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Ferreira et al., "A Scheme for Analyzing Electronic Payment Systems," Basil 1997.
Frantisek et al., "An Architectural View of Distributed Objects and Components in CORBA, Java RMI and COM/DCOM," Software—Concepts & Tools, vol. 19, No. 1, Jun. 1, 1998, pp. 14-28.
Galliford, Miles, "SnagIt Versus Free Screen Capture Software: Critical Tools for Website Owners," <http://www.subhub.com/articles/free-screen-capture-software>, Mar. 27, 2008, pp. 11.
Goldstein et al., "Stacks Lazy Threads: Implementing a Fast Parallel Call," Journal of Parallel and Distributed Computing, Jan. 1, 1996, pp. 5-20.
Gu et al., "Record Linkage: Current Practice and Future Directions," Jan. 15, 2004, pp. 32.
Han et al., "Efficient Computation of Iceberg Cubes with Complex Measures," ACM Sigmod, May 21-24, 2001, pp. 1-12.
Hua et al., "A Multi-attribute Data Structure with Parallel Bloom Filters for Network Services", HiPC 2006, LNCS 4297, pp. 277-288, 2006.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
JetScreenshot.com, "Share Screenshots via Internet in Seconds," <http://web.archive.org/web/20130807164204/http://www.jetscreenshot.com/>, Aug. 7, 2013, pp. 1.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.

Kitts, Paul, "Chapter 14: Genome Assembly and Annotation Process," The NCBI Handbook, Oct. 2002, pp. 1-21.
Kwout, <http://web.archive.org/web/20080905132448/http://www.kwout.com/> Sep. 5, 2008, pp. 2.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Microsoft Windows, "Microsoft Windows Version 2002 Print Out 2," 2002, pp. 1-6.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Mizrachi, Ilene, "Chapter 1: GenBank: The Nuckeotide Sequence Database," The NCBI Handbook, Oct. 2002, pp. 1-14.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
O'Reilly.com, http://oreilly.com/digitalmedia/2006/01/01/mac-os-x-screenshot-secrets.html published Jan. 1, 2006 in 10 pages.
Russell et al., "NITELIGHT: A Graphical Tool for Semantic Query Construction," 2008, pp. 10.
Schroder, Stan, "15 Ways to Create Website Screenshots," <http://mashable.com/2007/08/24/web-screenshots/>, Aug. 24, 2007, pp. 2.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008),ÈAcitrezza, Catania, Italy, Sep. 29-Oct. 3, 2008, pp. 16.
SnagIt, "SnagIt 8.1.0 Print Out 2," Software release date Jun. 15, 2006, pp. 1-3.
SnagIt, "SnagIt 8.1.0 Print Out," Software release date Jun. 15, 2006, pp. 6.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
Stamos et al., "Remote Evaluation," Journal ACM Transactions on Programming Languages and Systems (TOPLAS) vol. 12, Issue 4, Oct. 1990, pp. 537-564.
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.

\* cited by examiner

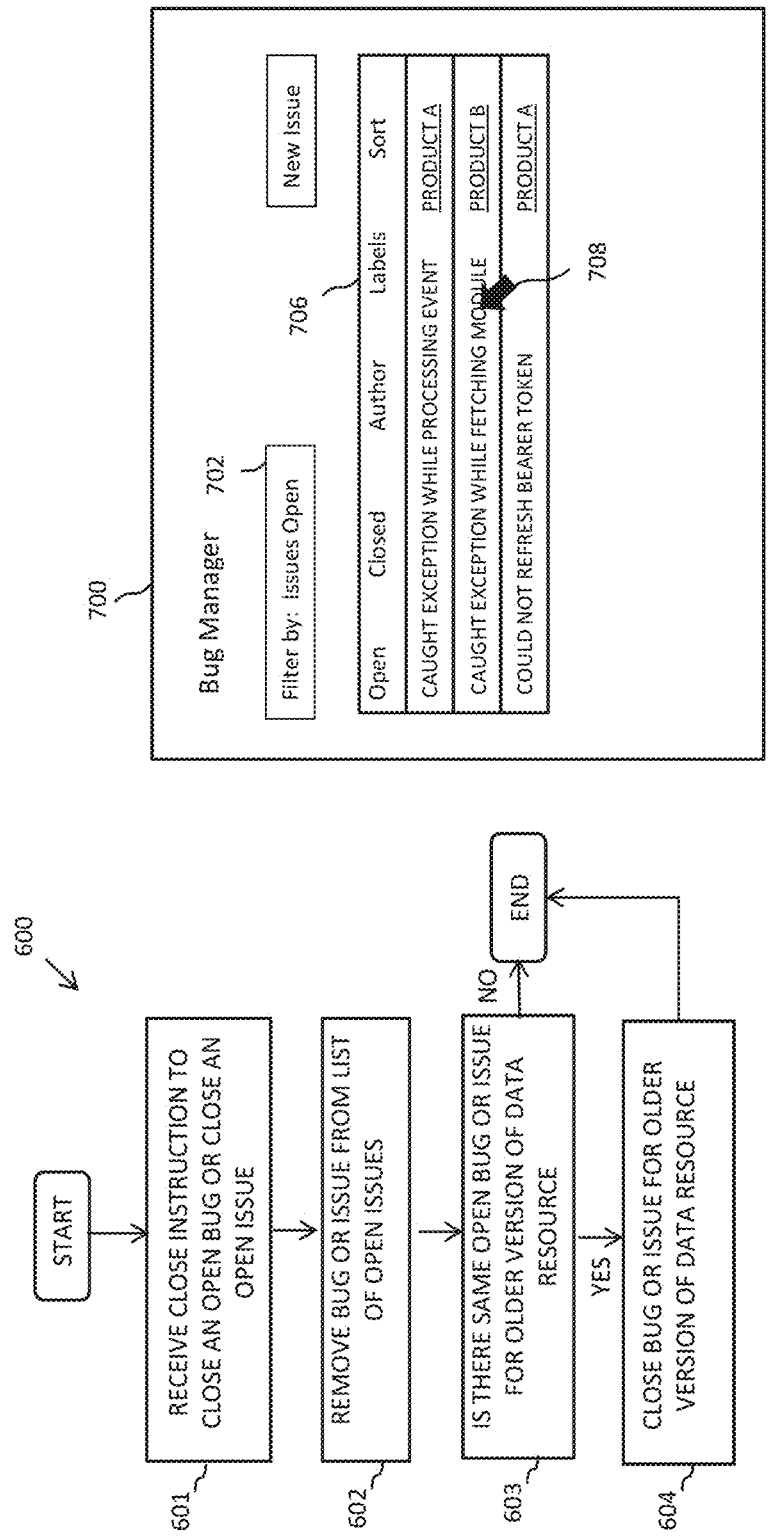

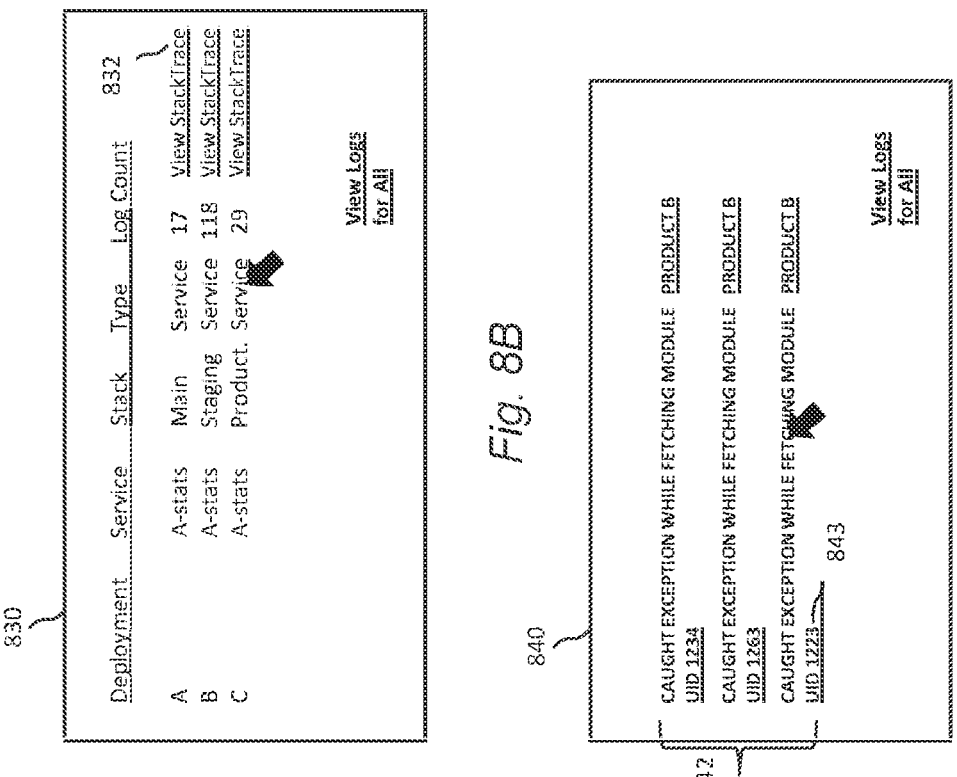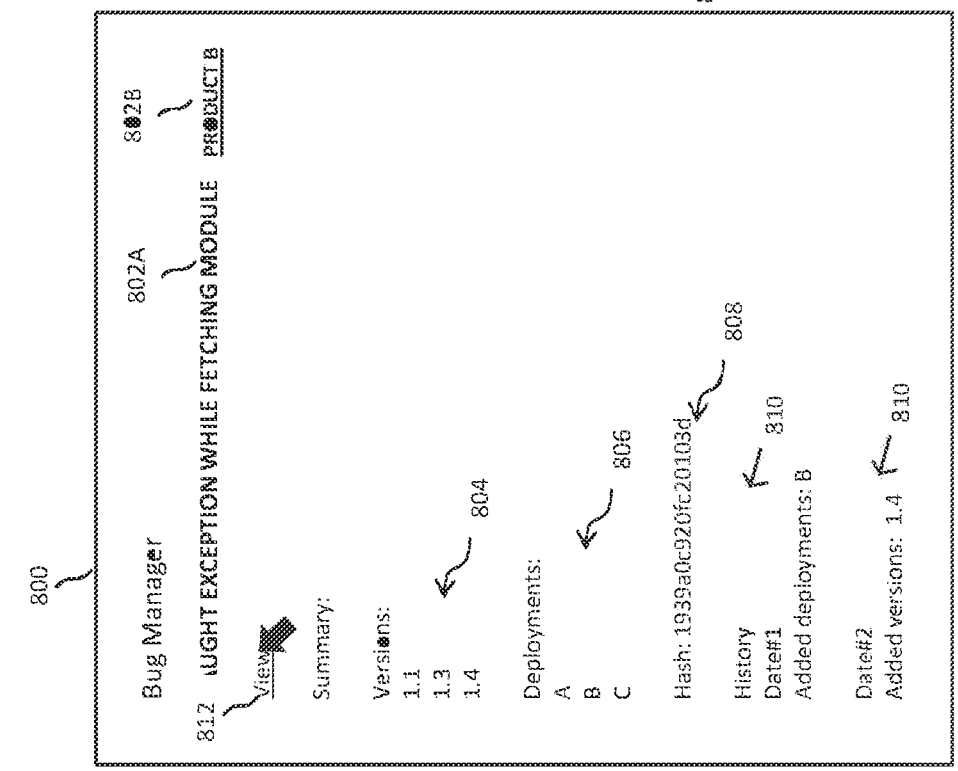

MANAGEMENT OF SOFTWARE BUGS IN A DATA PROCESSING SYSTEM

CROSS REFERENCE TO RELATED APPLICATIONS

This application claims the benefit of United Kingdom Application Number 1800595.9, filed Jan. 15, 2018, the content of which is incorporated by reference in its entirety into the present disclosure.

FIELD OF THE DISCLOSURE

The present disclosure relates to a method and systems for management of software bugs in a data processing system.

BACKGROUND

Cloud computing is a computing infrastructure for enabling ubiquitous access to shared pools of servers, storage, computer networks, applications and other data resources, which can be rapidly provisioned, often over the Internet.

A "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may for example be a data analysis application, a data transformation application, a report generating application, a machine learning process, a spreadsheet or a database.

Some companies provide cloud computing services for registered customers, for example manufacturing and technology companies, to create, store, manage and execute their own data resources. Sometimes, these data resources may interact with other data resources, for example those provided by the cloud platform provider. Certain data resources may be used to control external systems.

In the context of data, a "bug" is an error, failure or fault in a computer program or system that causes it to produce an incorrect or unexpected result. The process of remedying bugs is referred to as "debugging" or "fixing."

The typical lifecycle for managing bugs is for a user, upon noticing an incorrect or unexpected result, to ping an internal or external support team. A member of the support team, at a subsequent time, will attempt to fix the bug. If the manner of fixing is not immediately evident, or if the support team member cannot resolve it, a support ticket is requested for a more experienced developer to look into the bug issue at a further subsequent time. The developer will usually require contextual information from either or both the support team member and the original user, in order to understand, for example, what may have caused the bug or what else was happening when the bug became evident. It will be appreciated from the above that much back-and-forth email and/or telephone communication is involved, which is time-consuming and uses communications resources. Consequently, for even a modestly-sized organisation, debugging may involve significant delay, usually a matter of days, and therefore resource downtime, during which time related or similar bugs may be ongoing and hence producing incorrect output.

SUMMARY

A first aspect provides a method of managing software bugs in a data processing system comprising one or more data resources, the method being performed using one or more processors and comprising: receiving an indication of one or more bugs relating to one or more data resources, and contextual information for the one or more bugs; determining, from the received indication, one or more bug types and grouping the bugs by bug type for the same data resource to produce an aggregated list of open issues requiring fixing; presenting the aggregated list of one or more open issues on a user interface for selection, the one or more open issues being selectable; and responsive to receiving selection of a particular open issue, presenting contextual information for the one or more bugs within the group on the user interface.

The bug type may comprise a human-readable description of the bug or its effect.

Responsive to receiving selection of a particular open issue, the presented contextual information may comprise an expanded list of individual bugs, grouped or ordered based on type of the contextual information.

Responsive to receiving selection of a particular open issue, the presented contextual information may comprise one or more version numbers of the data resource to which the bug is related.

The contextual information may further comprise one or more of a deployment identifier indicative of where the affected one or more data resources are running, a date and/or time indicative of when the bug occurred, and a user identifier indicative of one or more users operating the data resource at said date and/or time.

The method may further comprise generating a first unique identifier for each indicated bug, which unique identifier is decodable upon selection of a particular bug from an expanded list of individual bugs, to provide to the user interface contextual information for the particular bug.

The method may further comprise receiving a close bug instruction indicative that a particular bug within an open issue has been fixed, and responsive thereto, removing the particular bug from the open issue.

The method may further comprise receiving a close issue command indicative that all bugs within an open issue have been fixed, and responsive thereto, closing the open issue such that it becomes a closed issue and no longer appears on the list of open issues.

The method may further comprise re-opening a closed bug or a closed issue, responsive to a further bug being received relating to the same bug type.

The method may further comprise re-opening a closed bug or a closed issue, responsive to a further bug being received relating to the same bug type.

The re-opened bug or re-opened issue may comprise contextual data for the re-opened bug or re-opened issue, including an indication of one or more fixes previously applied, and contextual data for the further bug.

The indication of the one or more fixes previously applied may comprise a link or option to deploy the same fix to the identified data resource, the method further comprising deploying said same fix responsive to user selection thereof.

In the event that a particular bug or open issue relating to a particular data resource version is closed, the method may further comprise automatically closing earlier open versions of bugs or issues relating to the same bug type.

In the event that a particular bug or open issue relating to a particular data resource version is closed, the method may further comprise automatically closing earlier open versions of bugs or issues relating to the same bug type.

A further aspect provides a computer program, optionally stored on a non-transitory computer readable medium program which, when executed by one or more processors of a data processing apparatus, causes the data processing apparatus to carry out a method comprising: receiving an indication of one or more bugs relating to one or more data resources, and contextual information for the one or more bugs; determining, from the received indication, one or more bug types and grouping the bugs by bug type for the same data resource to produce a aggregated list of open issues requiring fixing; presenting the aggregated list of one or more open issues on a user interface for selection, the one or more open issues being selectable; and responsive to receiving selection of a particular open issue, presenting contextual information for the one or more bugs within the group on the user interface.

A further aspect provides a system for managing software bugs in a data processing system, the system comprising: one or more physical processors; a memory storing instructions that, when executed by the one or more physical processors, cause the system to: receive an indication of one or more bugs relating to one or more data resources, and contextual information for the one or more bugs; determine, from the received indication, one or more bug types and grouping the bugs by bug type for the same data resource to produce a aggregated list of open issues requiring fixing; present the aggregated list of one or more open issues on a user interface for selection, the one or more open issues being selectable; and present, responsive to receiving selection of a particular open issue, contextual information for the one or more bugs within the group on the user interface.

A further aspect provides a method of managing software bugs in a data processing system comprising one or more data resources, the method being performed using one or more processors and comprising: receiving an indication of one or more bugs relating to one or more data resources, and contextual information for the one or more bugs; determining, from the received indication, one or more bug types and grouping the bugs by bug type for the same data resource to produce a aggregated list of open issues requiring fixing; presenting the aggregated list of one or more open issues on a user interface for selection, the one or more open issues being selectable; responsive to receiving selection of a particular open issue, presenting contextual information for the one or more bugs within the group on the user interface; wherein one or more bugs or open issues may be closed upon receiving input indicative that the bugs or open issues have been fixed and said one or more closed bugs or closed issues are automatically re-opened upon receiving a subsequent identification of one or more further bugs of the same bug type.

The re-opened bug or re-opened issue may comprise contextual data for the re-opened bug or re-opened issue, including an indication of one or more fixes previously applied, and contextual data for the further bug.

The indication of the one or more fixes previously applied may comprise a link or option to deploy the same fix to the identified data resource, the method further comprising deploying said same fix responsive to user selection thereof.

The bug type may comprise a human-readable description of the bug or its effect.

Responsive to receiving selection of a particular open issue, the presented contextual information may comprise an expanded list of individual bugs, grouped or ordered based on type of the contextual information.

The contextual information for the one or more bugs may comprise at least a version number of the data resource to which the bug is related, and wherein, responsive to receiving selection of a particular open issue, the expanded list comprises a list of the bugs grouped and/or ordered by version number.

Responsive to receiving selection of a particular open issue, the contextual information for the one or more bugs may further comprise one or more of a deployment identifier indicative of where the data resource is running, a date and/or time indicative of when the bug occurred, and a user identifier indicative of one or more users operating the data resource at said date and/or time.

The method may further comprise generating a first unique identifier for each indicated bug, which unique identifier is decodable upon selection of a particular bug from an expanded list of individual bugs, to provide to the user interface contextual information for the particular bug.

In the event that a particular bug or open issue relating to a particular data resource version is closed, the method may further comprise automatically closing earlier open versions of bugs or issues relating to the same bug type.

A further aspect provides computer program, optionally stored on a non-transitory computer readable medium program which, when executed by one or more processors of a data processing apparatus, causes the data processing apparatus to carry out a method according to any preceding definition.

A further aspect provides a system for managing software bugs in a data processing system, the system comprising: one or more physical processors; a memory storing instructions that, when executed by the one or more physical processors, cause the system to: receive an indication of one or more bugs relating to one or more data resources, and contextual information for the one or more bugs; determine, from the received indication, one or more bug types and grouping the bugs by bug type for the same data resource to produce a aggregated list of open issues requiring fixing; present the aggregated list of one or more open issues on a user interface for selection, the one or more open issues being selectable; present, responsive to receiving selection of a particular open issue, contextual information for the one or more bugs within the group on the user interface; wherein one or more bugs or open issues may be closed upon receiving input indicative that the bugs or open issues have been fixed and said one or more closed bugs or closed issues are automatically re-opened upon receiving a subsequent identification of one or more further bugs of the same bug type.

A further aspect provides a system for managing software bugs in a data processing system, the system comprising: one or more physical processors; a memory storing instructions that, when executed by the one or more physical processors, cause the system to perform the method of any preceding definition.

BRIEF DESCRIPTION OF THE DRAWINGS

Example embodiments will now be described by way of non-limiting example with reference to the accompanying drawings, in which:

FIG. 6 is a flow diagram showing other processing operations performed by the bug management application according to embodiments;

FIG. 7 is an example user interface of the bug management application according to embodiments;

FIG. 8A is another example user interface of the bug management application according to embodiments;

FIG. 8B is another example user interface of the bug management application according to embodiments;

FIG. 8C is another example user interface of the bug management application according to embodiments.

DETAILED DESCRIPTION OF CERTAIN EMBODIMENTS

Figure 1:
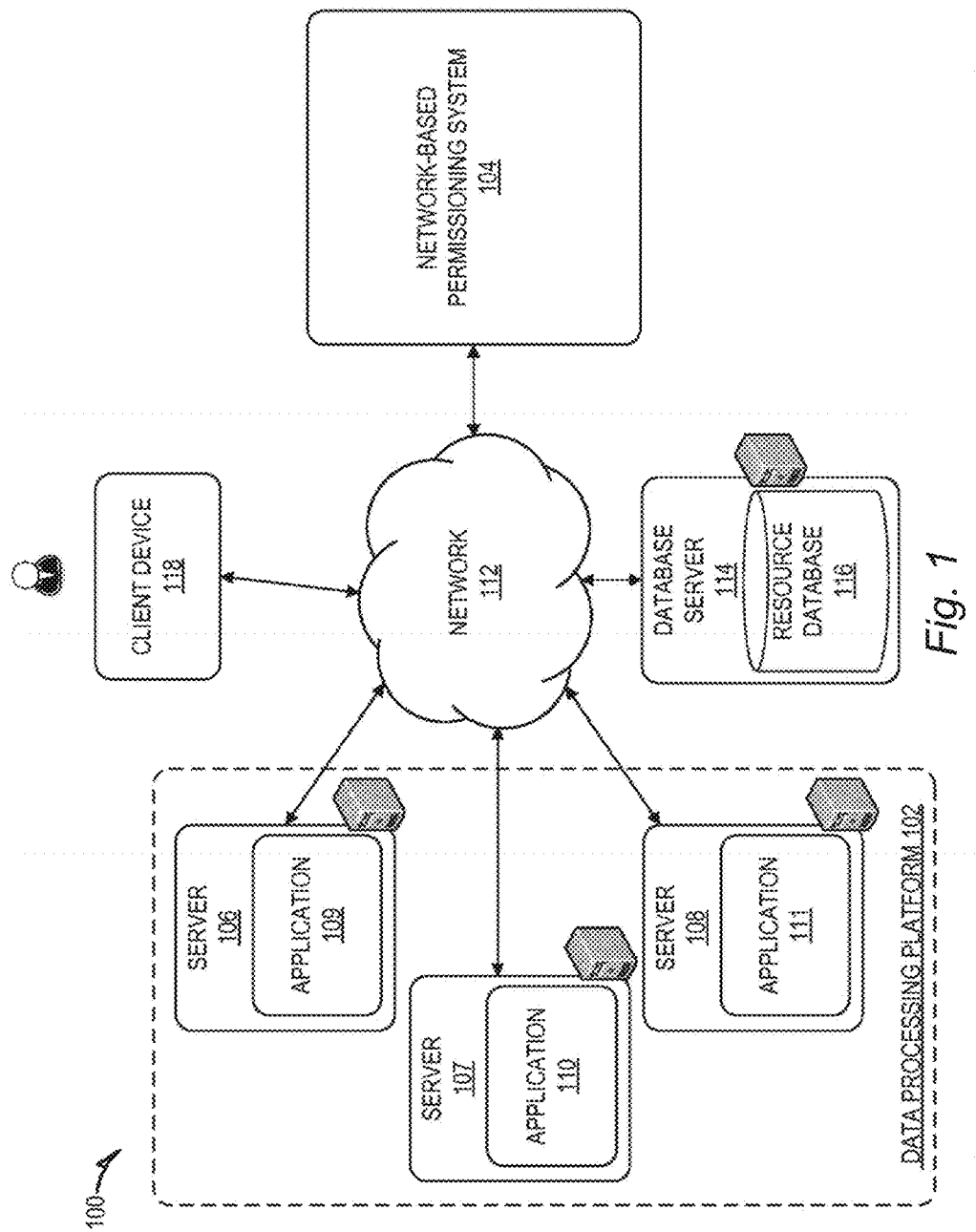
FIG. 1 is a block diagram illustrating a network system comprising a group of application servers of a data processing platform according to embodiments of this specification.

Embodiments herein relate to management of software bugs. In the context of software, a "bug" is an error, failure or fault in a computer program or system that causes it to produce an incorrect or unexpected result. The process of remedying bugs is referred to as "debugging" or "fixing." Fixing may be by means of producing a file for remedying the bug, commonly known as a "patch." A patch is usually an executable file distributed to affected users, groups of users or systems, whether directly or indirectly, but a patch can take other forms. When received, the patch is executed which updates the affected software. There are other means of fixing software bugs, as will be appreciated.

As noted previously, in large-scale computer processing environments or platforms, possibly handling large numbers of requests by large numbers of users, and possibly distributed across many organisations and territories, debugging can be a time-consuming and processing-intensive task. Debugging from a technical and administrative point of view may only be performed by a limited number of experts with knowledge of the particular data resource and its underlying operation, which also helps avoid or minimise further bugs which may result from fixes. This tends to create a bottleneck as users await their expertise, feedback and eventually the fix. This wait tends to involve much back-and-forth communication to evaluate the context of the bug and how it might affect others. In the meantime, the bug may leave data resources inaccessible and possibly vulnerable to attack.

Embodiments herein provide improvements in software bug management in such a way that the amount of data required to be shown to the user, e.g. a developer, on a physical display can be reduced, saving power and display real estate. Embodiments also permit patterns or trends to be identified in terms of what bugs are occurring on which products, versions and/or deployments. In some embodiments, closure and re-opening of bug issues may occur automatically to permit display of contextual information technically useful to the developer. The technically useful data may indicate a reported bug that was previously fixed for a different version of the data resource and/or on a different system or deployment.

Such management may be handled via an intuitive user interface which, in terms of displaying management data relating to bugs and context, represents a current technical state of one or more systems. Where the data resource is linked to a physical system, such as a hardware system, machinery or an industrial process, the state of said physical system is therefore represented.

In some embodiments, the user interface may prompt a user to deploy a particular fix based on historical data, such as a fix previously applied to the same bug type, which may be further based on context. This deployment may be through guided human interaction with the user interface.

In the context of the following, the following definitions apply.

A "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may for example be a data analysis application, a data transformation application, a report generating application, a machine learning process, a spreadsheet or a database.

Certain data resources may be data sets, which may be raw data or processed data. In this case, the data sets may be represented in any suitable form, for example as database tables comprising one or more rows and columns. The data sets may represent technical data, e.g. data representing sensed or measured data from physical sensors in an industrial setting. The data sets may represent inventory data. The data sets may represent pixels of an image. The data sets may represent financial data. Many other examples of what the data sets represent are envisaged.

A data processing platform is any computing platform on which executable code, or software, may be executed, providing particular functionality and restrictions, in that low-level functionality is provided which the executable code needs to conform to.

A data repository is any form of data storage entity into which data is specifically partitioned or isolated.

An execution environment is any representation of an execution platform, such as an operating system or a database management system.

A dataset, sometimes used interchangeably with data; a dataset holds data on the data processing platform, and usually has an accompanying schema for the dataset in order to make sense, or interpret, the data within the dataset.

A bug is an error, failure or fault in a computer program or system that causes it to produce an incorrect or unexpected result.

A fix is any way of removing or alleviating the bug, for example through producing a patch, whether in the form of code or a file, through guided instructions or through changing a configuration setting or parameter.

The data processing platform may be an enterprise software platform associated with an enterprise platform provider. An enterprise software platform enables use by multiple users, internal and external to the enterprise platform provider. The users may be users of different respective organisations, such as different commercial companies.

For example, an engine manufacturer may create and store a database relating to spare parts for the different models of engines it produces and services. The database may, for example, be a multi-dimensional relational database. Certain analyses may be performed on the database using another application, for example an executable application resource for analysing and/or transforming the data in order to identify trends which may be useful for predicting when certain parts will fail and/or need.

For this purpose, the software platform may comprise enterprise applications for machine-analysis of data resources. For example, an organisation may store on the software platform history data for a machine and use an enterprise application for the processing of history data for the machine in order to determine the probability, or a risk score, of the machine, or a component sub-system of the machine, experiencing a fault during a future interval. The enterprise application may use the fault probabilities or risk scores determined for a machine to select a preventative maintenance task which can reduce the probability and/or severity of the machine experiencing a fault. History data for a machine may include sensor logs, a sensor log being multiple measurements of physical parameters captured by a sensor and relating to different points in time (a time series). History data for a machine may also include computer readable logs such as maintenance logs, fault logs and message logs corresponding to a machine. The maintenance log corresponding to the machine may record information such as dates and locations of prior maintenance tasks, details of replacement parts, free text notes made by an engineer or mechanic performing a maintenance task and so forth. The fault log corresponding to the machine may record information such as dates and locations of faults, the types of faults, the period of time required to rectify each fault and so forth. The message log corresponding to a machine, such as a ship or construction machinery, may records messages generated by controllers, processors or similar devices which are integrated into the component sub-systems of the machine. The messages may include a date and time, an identifier of a component sub-system, and message content such as, for example, warning information of information identifying a fault.

The data processing platform on which the data resources are stored and executed may be a proprietary or open source platform, which offers advantages in terms of time-to-deploy on the platform provider's hardware, as well as offering partitioning of data and rolling upgrades. This may be particularly suited for automated deployment, scaling and management of applications. Such software platforms may employ containerised data resources.

FIG. 1 is a network diagram depicting a network system 100 comprising a data processing platform 102 in communication with a network-based permissioning system 104 (hereafter "permissioning system") configured for registering and evaluating access permissions for data resources to which a group of application servers 106-108 share common access, according to an example embodiment. Consistent with some embodiments, the network system 100 may employ a client-server architecture, though the present subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of application servers, specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

The applications 109-111 may be associated with a first organisation. One or more other applications (not shown) may be associated with a second, different organisation. These other applications may be provided on one or more of the application servers 106, 107, 108 which need not be specific to a particular organisation. Where two or more applications are provided on a common server 106-108 (or host), they may be containerised which as mentioned above enables them to share common functions. Each of the servers 106-108 may in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a separate database server 114. The resource database 116 may stores other data resources that may be used by any one of the applications 109-111 hosted by the data processing platform 102.

In other embodiments, one or more of the database server 114 and the network-based permissioning system 104 may be local to the data processing platform 102; that is, they may be stored in the same location or even on the same server or host as the network applications 109, 110, 111.

As shown, the network system 100 also includes a client device 118 in communication with the data processing platform 102 and the network-based permissioning system 104 over the network 112. The client device 118 communicates and exchanges data with the data processing platform 102. The client device 118 may be any of a variety of types of devices that include at least a display, a processor, and communication capabilities that provide access to the network 112 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
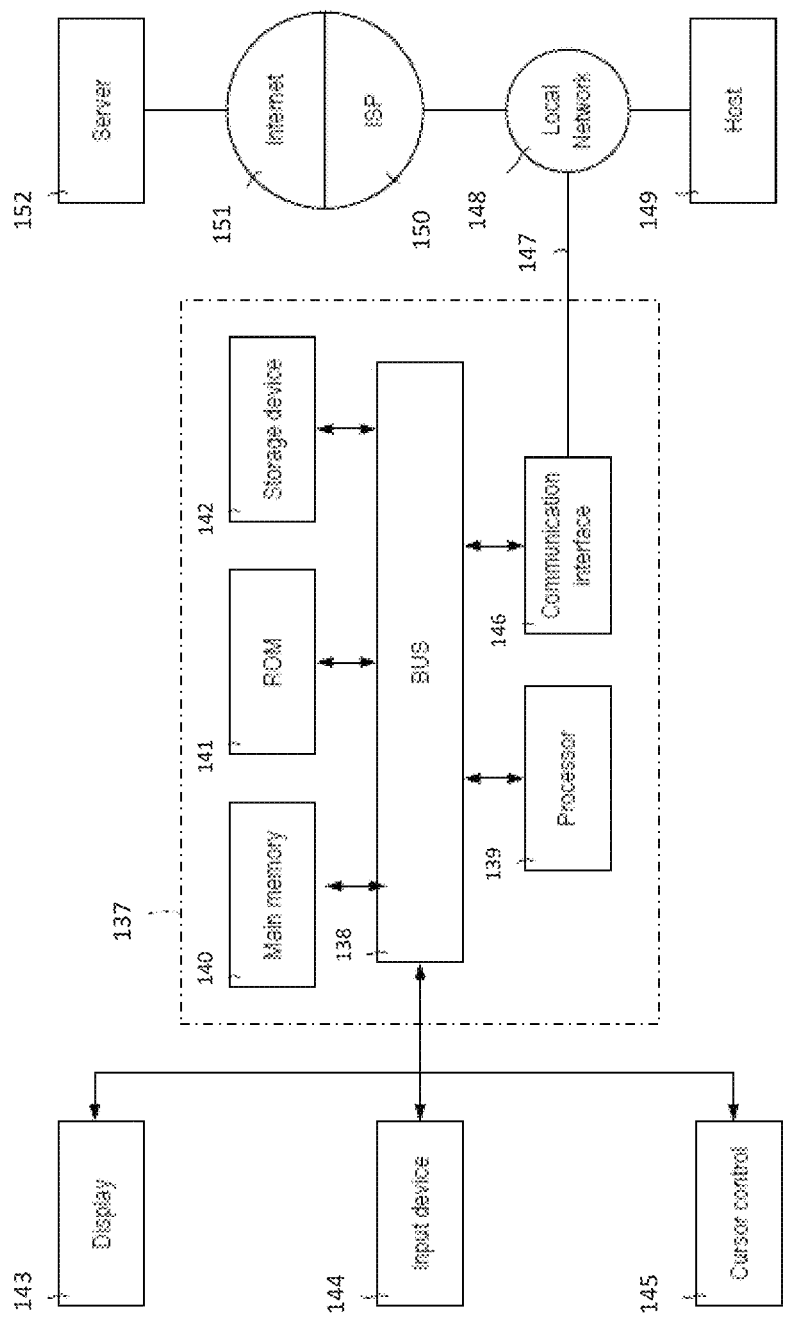
FIG. 2 is a block diagram of a computer system according to embodiments of this specification.

Referring to FIG. 2, a block diagram of an example computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

The data processing platform 102 may be a containerised data processing platform.

In this regard, a containerised data platform comprises "containers" which hold one or more applications, and associated data libraries, that are guaranteed to be co-located on the same host machine and which can share resources. Such software platforms may also provide a set of primitives which collectively provide mechanisms for deploying, maintaining and scaling applications. A basic scheduling unit may be called a pod. A pod may consist of one or more containers.

Software Bug Management

Embodiments will now be described in relation to methods, systems and computer-implemented processes for management of software bugs.

Embodiments particularly relate to providing a bug management module, which may be an application provided on one or more of the servers 106, 107, 108, or another server, which application enables one or more users, for example a developer or manager, to view in an intuitive way a list of bugs that require attention. In some embodiments, this is by means of a user interface (UI) presented in a display of a computer system, which user interface may display in one state an aggregated list of bugs of the same or a closely similar type, typically identifiable by means of a descriptor.

Figure 3:
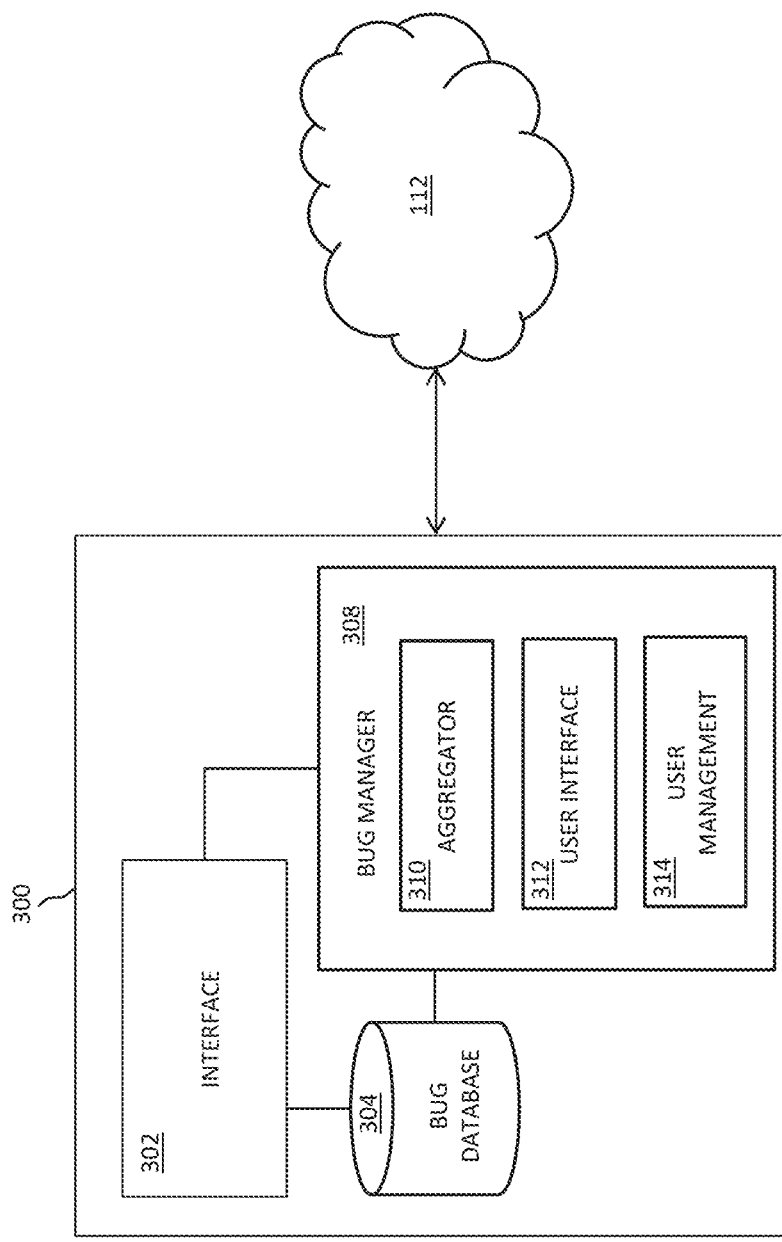
FIG. 3 is a schematic diagram of a bug management application or tool, according to embodiments of this specification.

In accordance with an example embodiment, one or more of the application servers 106, 107, 108 in the data processing platform 102 shown in FIG. 1 may comprise a comprises a bug management tool 300 (refer to FIG. 3.) The bug management tool 300 may be viewed and operated by one or more users, typically developers, to ascertain a current set of bugs for particular data resource in an aggregated manner, in that the bugs are grouped by bug type, and possibly also by product or data resource type, to create a list of open issues; by showing only a single reference to each open issue, the amount of display real estate needed to provide a snapshot of the current and possibly historical context of bugs is enabled.

Each open issue can be drilled-down to understand contextual information for each open issue, such as, but not limited to, one or more versions affected, one or more deployments affected, and potentially when the bugs occurred (time and/or date), who was using the affected data resource at the time the bug occurred, and so on. Some of this information may be derived by running one or more stack traces on selected data resources.

The bug management tool 300 may receive an indication of one or more bugs relating to one or more data resources, and contextual information for the one or more bugs. The received indication may be generated and transmitted automatically to the bug management tool 300 by the affected resource. The received indication may be transmitted manually, in another embodiment.

Using this, the bug management tool 300 may determine one or more bug types, and groups the bugs by bug type for the same data resource to produce a aggregated list of open issues requiring fixing.

The aggregated list of the one or more open issues may be presented on a user interface for selection (the one or more open issues may be selectable.)

Responsive to receiving selection of a particular open issue, the bug management tool 300 may present contextual information for the one or more bugs within the corresponding group on the user interface.

The bug type may comprise a human-readable description of the bug or its effect.

Responsive to receiving selection of a particular open issue, the presented contextual information may comprises an expanded list of individual bugs, grouped or ordered based on type of the contextual information. The contextual information may comprise at least a version number of the data resource to which the bug is related. Responsive to receiving selection of a particular open issue, the expanded list may comprise a list of the bugs grouped and/or ordered by version number.

The contextual information for the one or more bugs may further comprise one or more of a deployment identifier indicative of where the data resource is running, a date and/or time indicative of when the bug occurred, and a user identifier indicative of one or more users operating the data resource at said date and/or time.

The bug management tool 300 may generating a first unique identifier for each indicated bug, which unique identifier is decodable upon selection of a particular bug from the expanded list to provide to the user interface contextual information for the particular bug.

The bug management tool 300 may be responsive to receiving a close bug instruction indicative that a particular bug within an open issue has been fixed, to close the particular bug so that it no longer appears on the expanded list for the open issue.

The bug management tool 300 may receive a close issue instruction indicative that the one or more bugs within an open issue have been fixed, and responsive thereto, may closing the open issue such that it becomes a closed issue and no longer appears on the list of open issues.

The bug management tool 300 may re-open a closed bug or a closed issue, responsive to a further bug being received relating to the same bug type. In this way, contextual information relating to the bug type is immediately and automatically made available to the user.

The re-opened bug or the re-opened issue may comprise contextual data for the re-opened bug or re-opened issue, including an indication of one or more fixes previously applied, and contextual data for the further bug. The indication of the one or more fixes previously applied may comprise a link or option to deploy the same fix to the identified data resource.

In the event that a particular bug or open issue relating to a particular data resource version is closed, the bug management tool 300 may further automatically close earlier open versions of bugs or issues relating to the same bug type. This again helps save display real estate.

FIG. 3 is a block diagram illustrating various components of the bug management tool 300 which is assumed, by way of example, to be stored and operating on the server 106 shown in FIG. 1. It can however be stored on any server or other device connected to the network 112.

To avoid obscuring the inventive subject matter with unnecessary detail, various functional components (e.g., modules and engines) that are not germane to conveying an understanding of the subject matter have been omitted from FIG. 3. However, a skilled artisan will readily recognize that various additional functional components may be supported by bug management tool 300 to facilitate additional functionality that is not specifically described herein.

As is understood by skilled artisans in the relevant computer arts, each functional component (e.g., module) illustrated in FIG. 3 may be implemented using hardware (e.g., a processor of a machine) or a combination of logic (e.g., executable software instructions) and hardware (e.g., memory and processor of a machine) for executing the logic. Furthermore, the various functional components depicted in FIG. 8 may reside on a single computer (e.g., a laptop), or may be distributed across several computers in various arrangements such as cloud-based architectures. Moreover, it shall be appreciated that while the functional components (e.g., modules) of FIG. 3 are discussed in the singular sense, in other embodiments, multiple instances of one or more of the modules may be employed.

The bug management tool 300 is shown as including an interface module 302, a bug database 304, and a bug manager module 308 which includes an aggregator 310, a user interface 312, and a user management module 314, all configured to communicate with each other (e.g., via a bus, shared memory, a switch, or application programming interfaces (APIs)). The bug database 304 may reside on a machine-readable storage medium of the bug management tool 300, or on separate hardware such as on a different server or on a cloud-based device.

The interface module 302 receives information reporting bugs. The bug reports may be received in any format, and may be received directly or indirectly from data resources affected. The bug report may be generated automatically at the data resource or by one or more other data resources which monitor for bugs on associated or linked data resources. The bug reports may be received responsive to a user manually forwarding the bug report. The bug report may identify the bug type, which may typically comprise a description of the bug and/or its effect on the data resource. The bug report may for example be generated by a stack trace operation and may comprise all or part of the output. The bug type may be restricted to a predefined maximum number of alphanumeric characters. The bug report may be accompanied by an identifier of the data resource or product on which the bug occurred.

The interface module 302 may be in the form of application programming interface (API) that interprets received bug reports. The application programming interface (API) may similarly generate messages for the data resource that reported the bug, for example to acknowledge receipt of the bug report and/or to provide updates or to deploy fixes.

The interface module 801 is in signal communication with the bug database 304 and the bug manager 308. The interface module 801 may also generate a unique identifier or signature, typically a long string of hexadecimal characters, for association with each bug and from which individual bugs can be referred to, and fetched, by means of said unique identifier or signature.

The bug database 304 is a repository storing in a data structure form a list of all reported bugs, and associated contextual information, which may be accessed by the bug manager 308 via the unique identifier or signature. The bug database 304 may store this data structure in any suitable format, for example a tabular format, and may receive requests to fetch the data for one or more operations thereon. For example, the bug manager 308 may require a subset of the data structure, or may require transformation of a subset of the data structure or a filtered version thereof. Each bug in the bug database 304 is marked as either open or closed. An open bug is one awaiting a fix. A closed bug is one that has been fixed.

The bug manager 308 comprises the three above-mentioned components, which specifically are the aggregator 310, the user interface 312 and the user management module 314.

The aggregator 310 is configured to aggregate all bugs, stored in the bug database 304, into groups based on bug type. In embodiments herein, aggregation is by means of bug type and data resource identifier (or product) which is affected. Each group relates to an "issue" and any issue having an open bug is defined as an "open issue." Any issue with all closed bugs is referred to as a "closed issue." Each issue is assigned a unique identifier, referred to herein as a "hash ID" meaning that individual issues can be referred to and fetched as appropriate by means of the hash ID. The issues are also stored in the bug database 304 so that, for each issue, the constituent bugs can be identified.

The user interface 312 provides an intuitive display means to a display screen of the developer's user terminal, wherever that may be. Embodiments below provide example user interfaces, but in general, the user interface 312 may comprise a window that displays a list of issues, which can be predefined or filtered to show only open issues. In this way, a developer can immediately see in compact form which bugs require attention. The user interface 312 may present each issue in selectable form, for example as a link that opens a summary of other contextual information, within which individual items may be linked also. The user interface 312 therefore provides a means of drilling-down to understand the context of the bug, including for example one or more of which versions and deployments are affected, as well as historical data relating to fixes. This may be provided in a separate window, for example. Bugs on individual versions and deployments may be viewed, for example. Individual bugs may be reviewed. The user or users accessing the data resource at the time the bug occurred may be viewed.

Furthermore, in some embodiments, the context information may indicate one or more other data resources and/or users that the affected data resource was in communication with at the time the bug occurred.

The user interface 312 may also provide a means of deploying fixes, for example if an open bug or issue was previously fixed for the same bug type. The fix may be deployed through a guided set of interactions.

The user management module 314 is the processing entity that handles functionality to be described below, with reference to FIGS. 4 to 6, in cooperation with the other modules described herein.

Figures 4, 5:
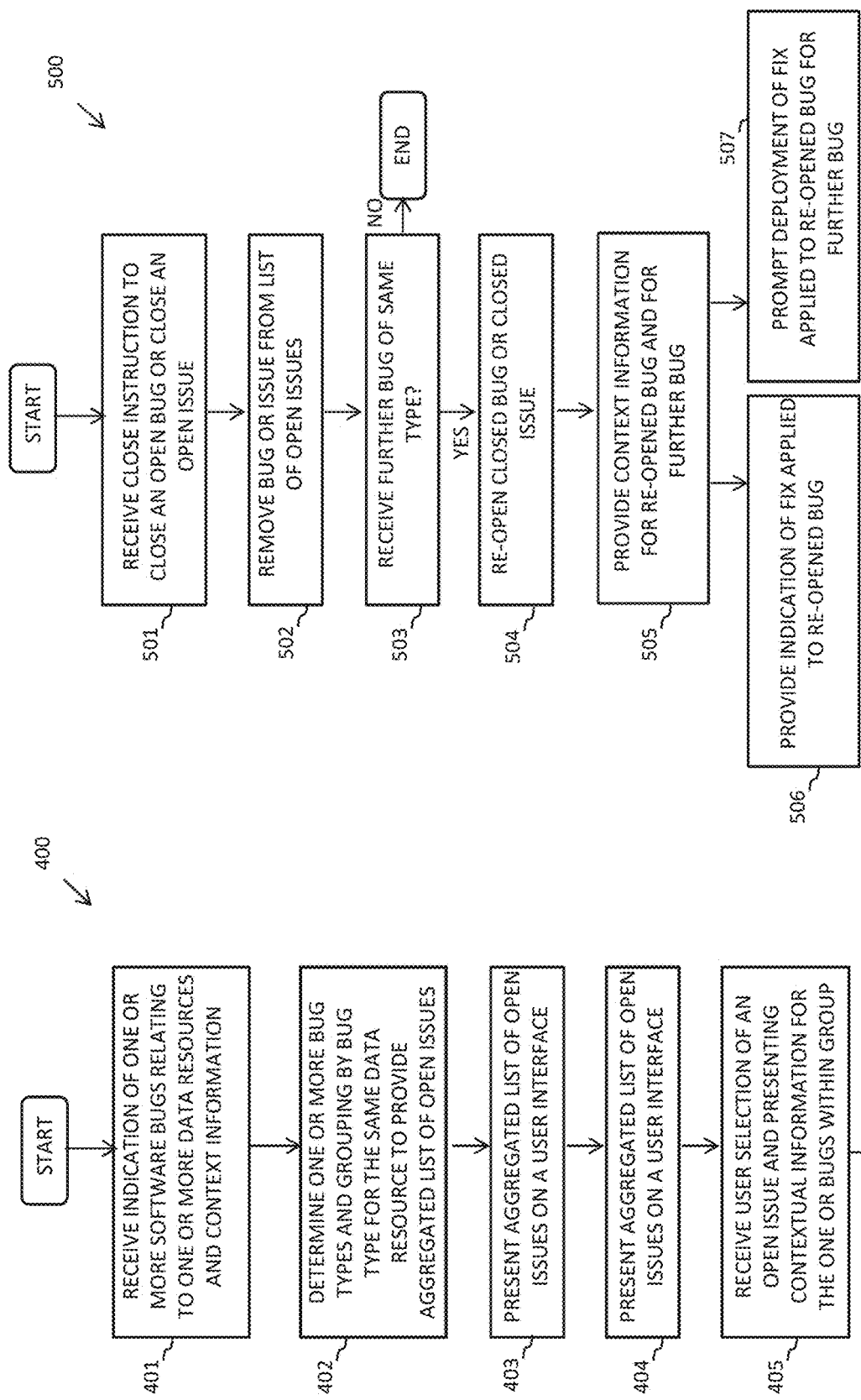
FIG. 4 is a flow diagram showing processing operations performed by the bug management application according to embodiments.
FIG. 5 is a flow diagram showing other processing operations performed by the bug management application according to embodiments.

FIG. 4 is a flowchart illustrating a method 400 for management of bugs. The method 400 is embodied in computer-readable instructions for execution by one or more processors such that the operations of the method are performed in part or in whole by the bug management tool 300 or another processing entity; accordingly, the method 400 is described below by way of example with reference thereto. However, it shall be appreciated that at least some of the operations of the method 400 may be deployed on various other hardware configurations, and the method is not intended to be limited to the bug management tool 300.

At operation 401, an indication of one or more bugs relating to one or more data resources is received, and contextual information for the one or more bugs.

At operation 402, it is determined, from the received indication, one or more bug types and the bugs are grouped by bug type for the same data resource to produce a aggregated list of open issues requiring fixing.

At operation 403, the aggregated list of one or more open issues is presented on a user interface for selection. The open issues may be selectable via the user interface.

At operation 404, responsive to receiving selection of a particular open issue, contextual information for the one or more bugs within the group is presented on the user interface.

A further operation 405, which is optional, comprises receiving user selection of an open issue and presenting contextual information for the one or more bugs within the issue group.

FIG. 5 is a flowchart illustrating another method 500 for management of bugs, which may be performed by the bug management tool 300 in addition to the FIG. 4 operations. The method 500 is embodied in computer-readable instructions for execution by one or more processors such that the operations of the method are performed in part or in whole by the bug management tool 300 or another processing entity; accordingly, the method 500 is described below by way of example with reference thereto. However, it shall be appreciated that at least some of the operations of the method 500 may be deployed on various other hardware configurations, and the method is not intended to be limited to the bug management tool 300.

At operation 501, a close instruction is received for closing an open bug or closing an open issue.

At operation 502, the relevant bug or issue is removed from the displayed list of open bugs or issues.

At operation 503, it is determined if a further bug of the same bug type (and possibly data resource identifier or product) is received.

At operation 504, if the previous question is affirmative, the closed bug or closed issue is re-opened.

At operation 505, context information for the re-opened bug or bug issue is provided, as well as for the further bug.

At operation 506, which is optional, an indication is provided of a fix already applied to the re-opened bug.

At operation 507, which is also optional, a prompt may be displayed for prompting deployment of a fix that was applied to the re-opened bug, i.e. to fix the further bug.

In some embodiments, the prompt may lead the user through a guided set of interactions via the user interface to initiate deployment of said fix. In some embodiments, no prompt may be presented, and rather the fix is deployed automatically.

FIG. 6 is a flowchart illustrating another method 600 for management of bugs, which may be performed by the bug management tool 300 in addition to the FIG. 4 and FIG. 5 operations. The method 600 is embodied in computer-readable instructions for execution by one or more processors such that the operations of the method are performed in part or in whole by the bug management tool 300 or another processing entity; accordingly, the method 600 is described below by way of example with reference thereto. However, it shall be appreciated that at least some of the operations of the method 600 may be deployed on various other hardware configurations, and the method is not intended to be limited to the bug management tool 300.

At operation 601, a close instruction is received for closing an open bug or open issue.

At operation 602, the bug or issue is removed from the list of open issues.

At operation 603, it is determined if there is the same open bug or issue for one or more older versions of the data resource?

At operation 604, if the previous question is affirmative, the open bugs or issues of the one or more older versions are automatically closed.

In this way, display real estate is used efficiently and the developer does not waste time chasing or investigating closed issues.

FIG. 7 shows an example user interface 700 when presented by the bug management tool 300. The user interface 700 may be a home screen and may permit a developer to see all open issues initially when they first open the bug management tool 300; the open issues may be ordered by the most recent or the least recent issue. A first filtering menu 702 permits the developer to select other filter options, for example to show all closed issues, or all issues (both open and closed.) The open issues 706 are provided in list form, and each issue in the list is selectable by means of any form of selection means such as a mouse pointer 708 or through a touch screen interface. Three open issues are shown in the list 706.

FIG. 8A shows a subsequent user interface window 800 responsive to selection of an issue in the FIG. 7 example.

For example, the subsequent user interface window 800 may display contextual information relating to the selected issue. For example, the issue here relates to "caught exception while fetching module" which is indicated by reference numeral 802A and the issue relates also to a "product B" which is indicated by reference numeral 802B. This combined information is an example of a bug type by which bugs are aggregated.

The information presented in the user interface window 800 comprises the aggregated contextual information for the constituent bugs. For example, a first portion 804 shows all versions of the data resource that was affected. These may be software versions. A second portion 806 shows all deployments affected. A third portion 808 shows a unique hash ID for the issue, which enables the issue to be uniquely identified for reference in the bug database 304 and also linked to other issues. A fourth portion 810 shows one or more items of historical data, such as a date, time and description of any patches, fixes, updates etc. that were made by the developer or others.

A button or link 812 is also provided for launching a more detailed version of the FIG. 8A information, an example of which is shown in FIG. 8B.

FIG. 8B shows in a further user interface window 830 more detailed information on the particular, selected issue. For example, for each deployment, a description of the relevant service, stack, type and log count may be presented. Further each deployment may comprise an associated link 832 for viewing the individual stack traces associated with each deployment for a further understanding of the causes.

FIG. 8C shows in a further user interface window 840 a list of each individual bug 842, grouped under the selected issue. Each member of the list 842 is user selectable to provide contextual information for each individual bug. A unique identifier 843 is shown associated with each bug.

Figure 9:
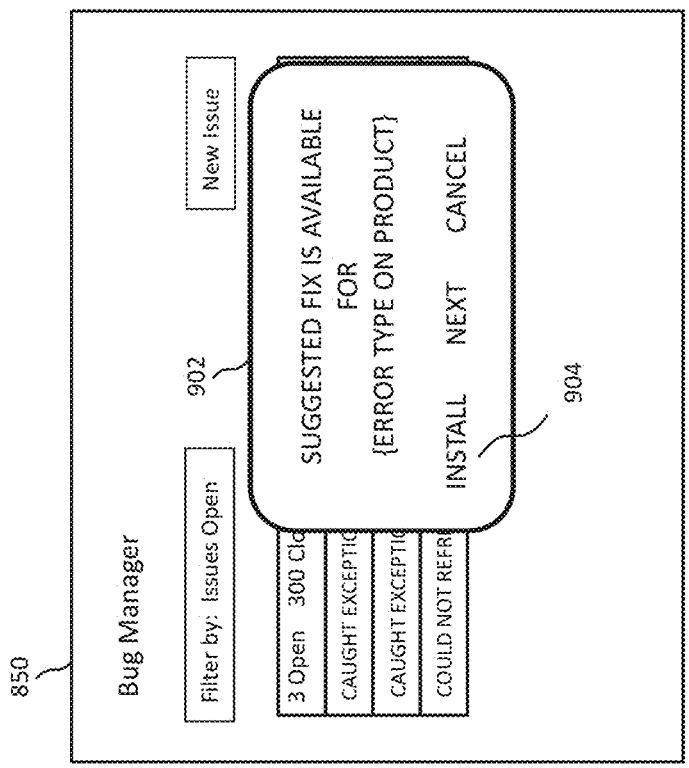
FIG. 9 is another example user interface of the bug management application according to embodiments.

FIG. 9 shows in a further user interface window 850 an example prompt 902 that may appear responsive to the bug management tool 300 identifying that a fix for the same problem was previously deployed. The prompt 902 forms the, or a first, interactive panel for guiding the developer to deploy the fix to one or more of the data resources affected. For example, responsive to selection of an "Install" button 904, another panel may ask the developer to choose between "Install for All" or "Install for Selected Users" or similar.

Modules, Components and Logic

Certain embodiments are described herein as including logic or a number of components, modules, or mechanisms.

Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

The invention claimed is:

1. A method of managing software bugs in a data processing system comprising one or more data resources, the method being performed using one or more processors and comprising:
   receiving an indication of one or more bugs relating to one or more data resources, and contextual information for the one or more bugs;
   determining, from the received indication, one or more bug types and grouping the bugs by bug type for the same data resource to produce an aggregated list of open issues requiring fixing;
   presenting the aggregated list of one or more open issues on a user interface for selection, the one or more open issues being selectable, each open issue comprising one or more bugs of a common bug type;
   responsive to receiving selection of a particular open issue, presenting particular contextual information of the particular open issue, the particular contextual information comprising:
      a description of any of patches, fixes, or updates associated with the particular open issue; and
      a hash identifier referring to the one or more bugs of the particular open issue, that uniquely identifies the particular open issue and links the particular open issue to other issues on the user interface; and
   providing an option to deploy a same fix to all data resources to which the bugs of the particular open issue are related, and wherein the presenting contextual information further comprises:
   displaying a list of version numbers of the data resource affected by the particular open issue directly above a list of deployments affected by the particular open issue;
   displaying the list of deployments affected by the particular open issue directly above the hash identifier of the particular open issue;
   displaying the hash identifier of the particular open issue directly above a date or a time, or the description of any of patches, fixes, or updates associated with the particular open issue, and further comprising:
   responsive to clicking a button or link on the user interface, presenting a description of a service, stack, type, log count, and a link to individual stack traces for each of the deployments.

2. The method of claim 1, wherein, responsive to receiving selection of the particular open issue, the presented contextual information comprises an expanded list of individual bugs, grouped or ordered based on type of the contextual information.

3. The method of claim 1, wherein, responsive to receiving selection of the particular open issue, the presented contextual information comprises one or more version numbers of the data resource to which the bug is related.

4. The method of claim 3, wherein the contextual information further comprises one or more of a deployment identifier indicative of where the affected one or more data resources are running, a date and/or time indicative of when the bug occurred, and a user identifier indicative of one or more users operating the data resource at said date and/or time.

5. The method of claim 1, further comprising generating a first unique identifier for each indicated bug, which unique identifier is decodable upon selection of a particular bug from an expanded list of individual bugs, to provide to the user interface contextual information for the particular bug.

6. The method of claim 1, further comprising receiving a close bug instruction indicative that a particular bug within an open issue has been fixed, and responsive thereto, removing the particular bug from the open issue.

7. The method of claim 1, further comprising receiving a close issue command indicative that all bugs within an open issue have been fixed, and responsive thereto, closing the open issue such that it becomes a closed issue and no longer appears on the list of open issues.

8. The method of claim 6, further comprising re-opening a closed bug or a closed issue, responsive to a further bug being received relating to the same bug type.

9. The method of claim 7, further comprising re-opening a closed bug or a closed issue, responsive to a further bug being received relating to the same bug type.

10. The method of claim 8, wherein the re-opened bug or re-opened issue comprises contextual data for the re-opened bug or re-opened issue, including an indication of one or more fixes previously applied, and contextual data for the further bug.

11. The method of claim 10, wherein the indication of the one or more fixes previously applied comprises a link or option to deploy the same fix to the identified data resource, the method further comprising deploying said same fix responsive to user selection thereof.

12. The method of claim 6, wherein in the event that a particular bug or open issue relating to a particular data resource version is closed, the method further comprises automatically closing earlier open versions of bugs or issues relating to the same bug type.

13. The method of claim 7, wherein in the event that a particular bug or open issue relating to a particular data resource version is closed, the method further comprises automatically closing earlier open versions of bugs or issues relating to the same bug type.

14. A non-transitory computer-readable storage medium including instructions that, when executed by at least one processor of a computing system, cause the computing system to perform a method comprising:

receiving an indication of one or more bugs relating to one or more data resources, and contextual information for the one or more bugs;

determining, from the received indication, one or more bug types and grouping the bugs by bug type for the same data resource to produce a aggregated list of open issues requiring fixing, each open issue comprising one or more bugs of a common bug type;

presenting the aggregated list of one or more open issues on a user interface for selection, the one or more open issues being selectable; and responsive to receiving selection of a particular open issue, presenting particular contextual information of the particular open issue, the particular contextual information comprising:

a description of any of patches, fixes, or updates associated with the particular open issue;

a hash identifier referring to the one or more bugs of the particular open issue, that uniquely identifies the particular open issue and links the particular open issue to other issues on the user interface; and providing an option to deploy a same fix to all the data resources to which the bugs of the particular open issue are related, and wherein the presenting contextual information further comprises:

displaying a list of version numbers of the data resource affected by the particular open issue directly above a list of deployments affected by the particular open issue;

displaying the list of deployments affected by the particular open issue directly above the hash identifier of the particular open issue;

displaying the hash identifier of the particular open issue directly above a date or a time, or the description of any of patches, fixes, or updates associated with the particular open issue; and responsive to clicking a button or link on the user interface, presenting a description of a service, stack, type, log count, and a link to individual stack traces for each of the deployments.

15. The non-transitory computer-readable storage medium of claim 14, wherein, responsive to receiving selection of the particular open issue, the presented contextual information comprises an expanded list of individual bugs, grouped or ordered based on type of the contextual information.

16. A system for managing software bugs in a data processing system, the system comprising:

one or more physical processors;

a memory storing instructions that, when executed by the one or more physical processors, cause the system to:

receive an indication of one or more bugs relating to one or more data resources, and contextual information for the one or more bugs;

determine, from the received indication, one or more bug types and grouping the bugs by bug type for the same data resource to produce a aggregated list of open issues requiring fixing, each open issue comprising one or more bugs of a common bug type;

present the aggregated list of one or more open issues on a user interface for selection, the one or more open issues being selectable;

present, responsive to receiving selection of a particular open issue, particular contextual information of the particular open issue, the particular contextual information comprising:

a description of any of patches, fixes, or updates associated with the particular open issue;

a hash identifier referring to the one or more bugs of the particular open issue, that uniquely identifies the particular open issue and links the particular open issue to other issues on the user interface; and providing an option to deploy a same fix to all the data resources to which the one or more bugs of the particular open issue are related, and wherein the presenting contextual information further comprises:

displaying a list of version numbers of the data resource affected by the particular open issue directly above a list of deployments affected by the particular open issue;

displaying the list of deployments affected by the particular open issue directly above the hash identifier of the particular open issue;

displaying the hash identifier of the particular open issue directly above a date or a time, or the description of any of patches, fixes, or updates associated with the particular open issue; and responsive to clicking a button or link on the user interface, presenting a description of a service, stack, type, log count, and a link to individual stack traces for each of the deployments.

17. The method of claim 1, wherein the bug type comprises a human-readable description of the bug or its effect.

18. The system of claim 16, wherein, responsive to receiving selection of the particular open issue, the presented contextual information comprises an expanded list of individual bugs, grouped or ordered based on type of the contextual information.

19. The system of claim 16, further comprising a unique identifier for each of the one or more bugs, the unique identifier being decodable to provide information comprising:
   a version number of a data resource to which the bug is related;
   deployment identifiers indicating where the data resources are running;
   dates and times indicative of when the one or more bugs occurred; and
   user identifiers indicative of one or more users operating the data resources at the dates and the times.

20. The method of claim 1, further comprising:
   arranging the one or more bugs of the particular open issue in an order according to one or more version numbers of the data resources to which the bugs of the particular open issue are related.

* * * * *